US012188527B2

(12) United States Patent
Ishikura et al.

(10) Patent No.: US 12,188,527 B2
(45) Date of Patent: Jan. 7, 2025

(54) PROPELLER SHAFT

(71) Applicant: HITACHI ASTEMO, LTD., Hitachinaka (JP)

(72) Inventors: Kenichiro Ishikura, Hitachinaka (JP); Kenichi Sugiyama, Hitachinaka (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 610 days.

(21) Appl. No.: 17/434,977

(22) PCT Filed: Jan. 28, 2020

(86) PCT No.: PCT/JP2020/002899
§ 371 (c)(1),
(2) Date: Aug. 30, 2021

(87) PCT Pub. No.: WO2020/179286
PCT Pub. Date: Sep. 10, 2020

(65) Prior Publication Data
US 2022/0136565 A1 May 5, 2022

(30) Foreign Application Priority Data

Mar. 1, 2019 (JP) .................................. 2019-037167

(51) Int. Cl.
*F16D 3/223* (2011.01)
*F16D 3/84* (2006.01)

(52) U.S. Cl.
CPC ............... *F16D 3/223* (2013.01); *F16D 3/84* (2013.01); *F16D 2003/22326* (2013.01)

(58) Field of Classification Search
CPC . F16D 3/223; F16D 3/84; F16D 3/843; F16D 2003/22326; Y10S 464/906
(Continued)

(56) References Cited

U.S. PATENT DOCUMENTS 3,633,382 A * 1/1972 Westercamp ......... F16D 3/2265
464/145
5,334,096 A * 8/1994 Iwao ....................... F16D 3/227
464/146
(Continued)

FOREIGN PATENT DOCUMENTS

AT          309161 B  *  8/1973   ... F16D 2003/22326
DE      10251056 A1  *  5/2004   ............. F16D 3/223
(Continued)

OTHER PUBLICATIONS

International Search Report dated Mar. 17, 2020 issued in International Application No. PCT/JP2020/002899, with English translation, 7 pages.
(Continued)

*Primary Examiner* — Josh Skroupa
(74) *Attorney, Agent, or Firm* — FOLEY & LARDNER LLP (57) ABSTRACT

A propeller shaft includes a rotational shaft and a constant-velocity joint. The constant-velocity joint includes an inner race member connected to the rotational shaft, a rolling member disposed on an outer periphery of the inner race member in a radial direction relative to a direction of a rotational axis of the rotational shaft, and a tubular outer race member provided on an outer periphery of the rolling member in the radial direction and configured so that a rotational force of the rotational shaft is transmitted thereto via the rolling member. The outer race member has first and second end portions of the outer race member in the direction of the rotational axis. The outer race member includes a centering portion provided at the first end portion and formed so as to be smaller than a maximum diameter of the outer race member in the radial direction.

15 Claims, 6 Drawing Sheets

(58) Field of Classification Search
USPC .................................. 464/15, 139–146, 906
See application file for complete search history.

(56) References Cited

U.S. PATENT DOCUMENTS

| | | | | |
|---|---|---|---|---|
| 5,899,814 | A * | 5/1999 | Murillo | F16D 3/227 464/145 |
| 6,368,224 | B1 * | 4/2002 | Knodle | F16D 3/227 464/146 |
| 6,540,616 | B2 * | 4/2003 | Miller | F16D 3/223 464/17 |
| 6,585,601 | B2 * | 7/2003 | Booker | F16D 3/845 464/146 |
| 6,981,919 | B2 * | 1/2006 | Sugiyama | F16D 3/845 464/146 |
| 7,008,327 | B2 * | 3/2006 | Kuczera | F16D 3/223 464/146 |
| 7,077,753 | B2 * | 7/2006 | Kuczera | F16D 3/223 464/144 |
| 7,677,984 | B2 * | 3/2010 | Hahn | F16D 3/845 464/906 |
| 7,905,785 | B2 * | 3/2011 | Madden | F16D 3/843 464/906 |
| 8,157,657 | B2 * | 4/2012 | LaMothe | F16D 3/843 464/145 |
| 8,197,349 | B2 * | 6/2012 | Terada | F16D 3/227 464/906 |
| 8,721,461 | B2 * | 5/2014 | LaMothe | F16D 3/223 464/906 |
| 8,925,929 | B2 * | 1/2015 | Cermak | F16D 3/223 464/906 |
| 11,448,265 | B2 * | 9/2022 | Seidel | F16D 3/843 |
| 11,525,484 | B2 * | 12/2022 | Funahashi | F16D 3/223 |
| 2007/0173337 | A1 * | 7/2007 | Wormsbaecher | F16D 3/845 464/179 |
| 2008/0146355 | A1 | 6/2008 | Madden et al. | |
| 2010/0016088 | A1 | 1/2010 | Madden et al. | |
| 2014/0179449 | A1 * | 6/2014 | Miller | F16D 3/223 464/175 |
| 2014/0213374 | A1 * | 7/2014 | Cassell | F16D 3/223 464/145 |
| 2016/0298694 | A1 | 10/2016 | Edwards et al. | |

FOREIGN PATENT DOCUMENTS

| | | | | |
|---|---|---|---|---|
| FR | 2025326 | A5 * | 9/1974 | ... F16D 2003/22326 |
| GB | 1021690 | A * | 3/1966 | ......... Y10S 464/906 |
| JP | 2006-117167 | A | 5/2006 | |
| JP | 2010-513824 | A | 4/2010 | |
| JP | 4897636 | B2 | 3/2012 | |
| JP | 2016-153285 | A | 8/2016 | |
| JP | 2018-511761 | A | 4/2018 | |

OTHER PUBLICATIONS

Written Opinion of the International Searching Authority dated Mar. 17, 2020 issued in International Application No. PCT/JP2020/002899, with English translation, 28 pages.

* cited by examiner

PROPELLER SHAFT

TECHNICAL FIELD

The present invention relates to a propeller shaft.

BACKGROUND ART

Examples of generally known propeller shafts for automobiles include the technique discussed in the following patent literature, PTL 1.

According to PTL 1, this propeller shaft includes a constant-velocity joint equipped with an outer race having a generally constant outer diameter on one axial end side, and is attached to a vehicle-side counterpart component by fastening bolts with use of through-holes provided in the outer race. At this time, the propeller shaft and the vehicle-side counterpart component are centered by fitting the outer diameter portion of the outer race of the constant-velocity joint.

CITATION LIST

Patent Literature

PTL 1: Japanese Patent No. 4897636

SUMMARY OF INVENTION

Technical Problem

However, the technique discussed in PTL 1 involves such a problem that, since the propeller shaft and the vehicle-side counterpart component are centered by fitting the outer diameter portion of the outer race, the counterpart component inevitably undesirably becomes larger than the outer diameter portion of the outer race, thereby undesirably increasing in size.

One of objects of the present invention is to provide a propeller shaft capable of reducing the size of the shape of a fitted portion, thereby allowing a vehicle-side counterpart component such as a transmission and a differential to have a small size.

Solution to Problem

According to one aspect of the present invention, a propeller shaft includes a rotational shaft and a constant-velocity joint provided on the propeller shaft. The constant-velocity joint includes an inner race member connected to the rotational shaft of the propeller shaft, a rolling member disposed on an outer periphery of the inner race member in a radial direction with respect to a direction of a rotational axis of the rotational shaft, and a tubular outer race member provided on an outer periphery of the rolling member in the radial direction and configured in such a manner that a rotational force of the rotational shaft is transmitted thereto via the rolling member. The outer race member has a first end portion and a second end portion that are both end portions of the outer race member in the direction of the rotational axis. The outer race member includes a centering portion provided at the first end portion of these end portions and formed so as to be smaller than a maximum diameter of the outer race member in the radial direction.

Advantageous Effects of Invention

Therefore, the propeller shaft according to the one aspect of the present invention can allow a vehicle-side counterpart component such as a transmission and a differential to have a small size.

BRIEF DESCRIPTION OF DRAWINGS

FIG. 3($a$) is an enlarged cross-sectional view of a constant-velocity joint 3 according to a second embodiment, and FIG. 3($b$) is a side view of the constant-velocity joint 3 according to the second embodiment.

FIG. 6($a$) is an enlarged cross-sectional view of a constant-velocity joint 3 according to a fourth embodiment, and FIG. 6($b$) illustrates a centering member 400 alone.

DESCRIPTION OF EMBODIMENTS

First Embodiment

Figure 1:
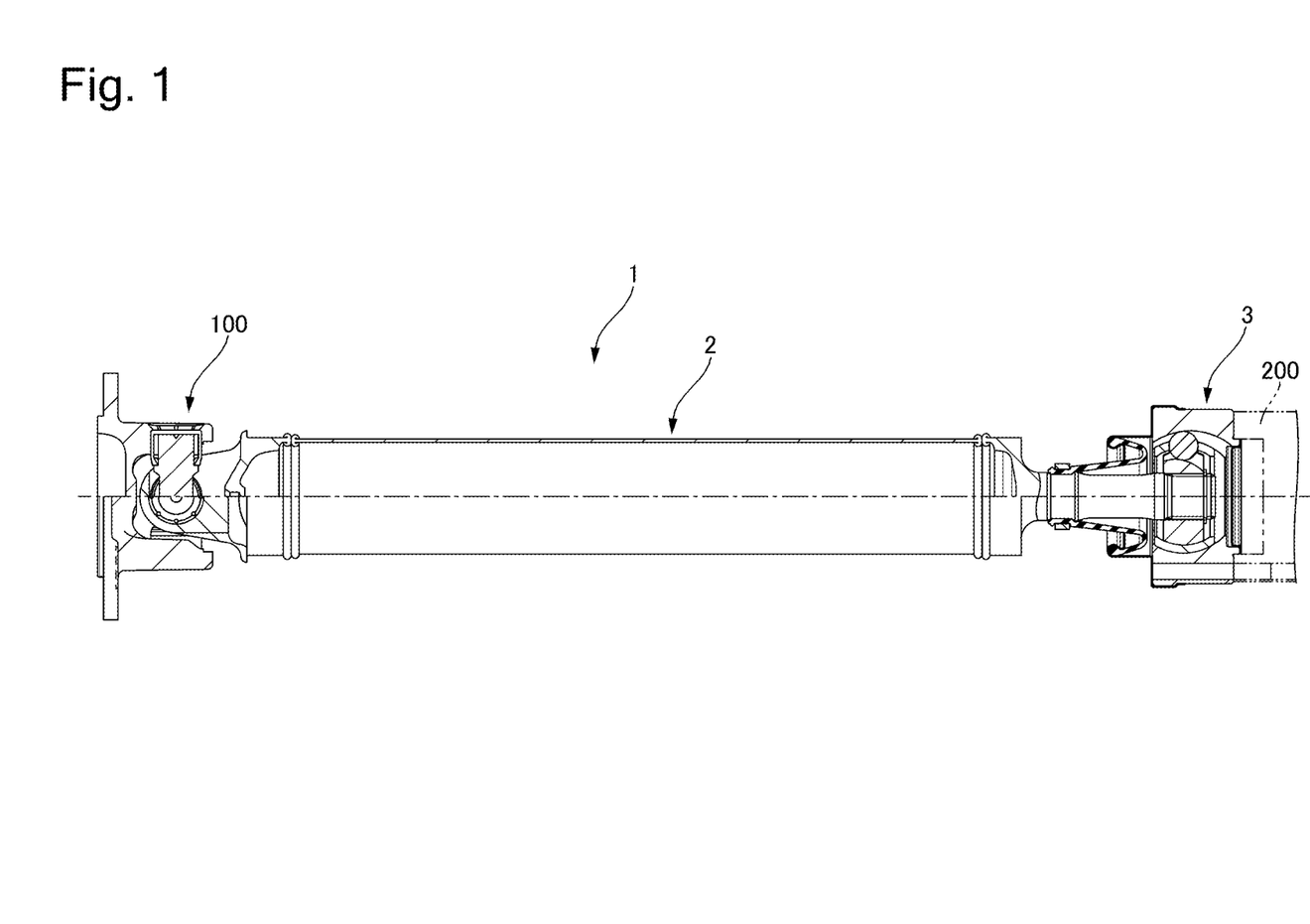
FIG. 1 illustrates the overall configuration of a propeller shaft 1 according to a first embodiment.

FIG. 1 illustrates the overall configuration of a propeller shaft according to a first embodiment.

In the following description, the present embodiment will be described referring to the left side and the right side in FIG. 1 as a "vehicle front side" and a "vehicle rear side", respectively, for convenience.

(Configuration of Propeller Shaft) A propeller shaft 1 includes a shaft member 2. One end of the shaft member 2 is integrally rotatably coupled via a Cardan joint 100 coupled with a transmission coupled with a not-illustrated engine serving as a driving source. The other end of the shaft member 2 is integrally rotatably coupled via a constant-velocity joint 3 coupled with a vehicle-side counterpart component 200 of a differential coupled with a not-illustrated driving wheel.

Figure 2:
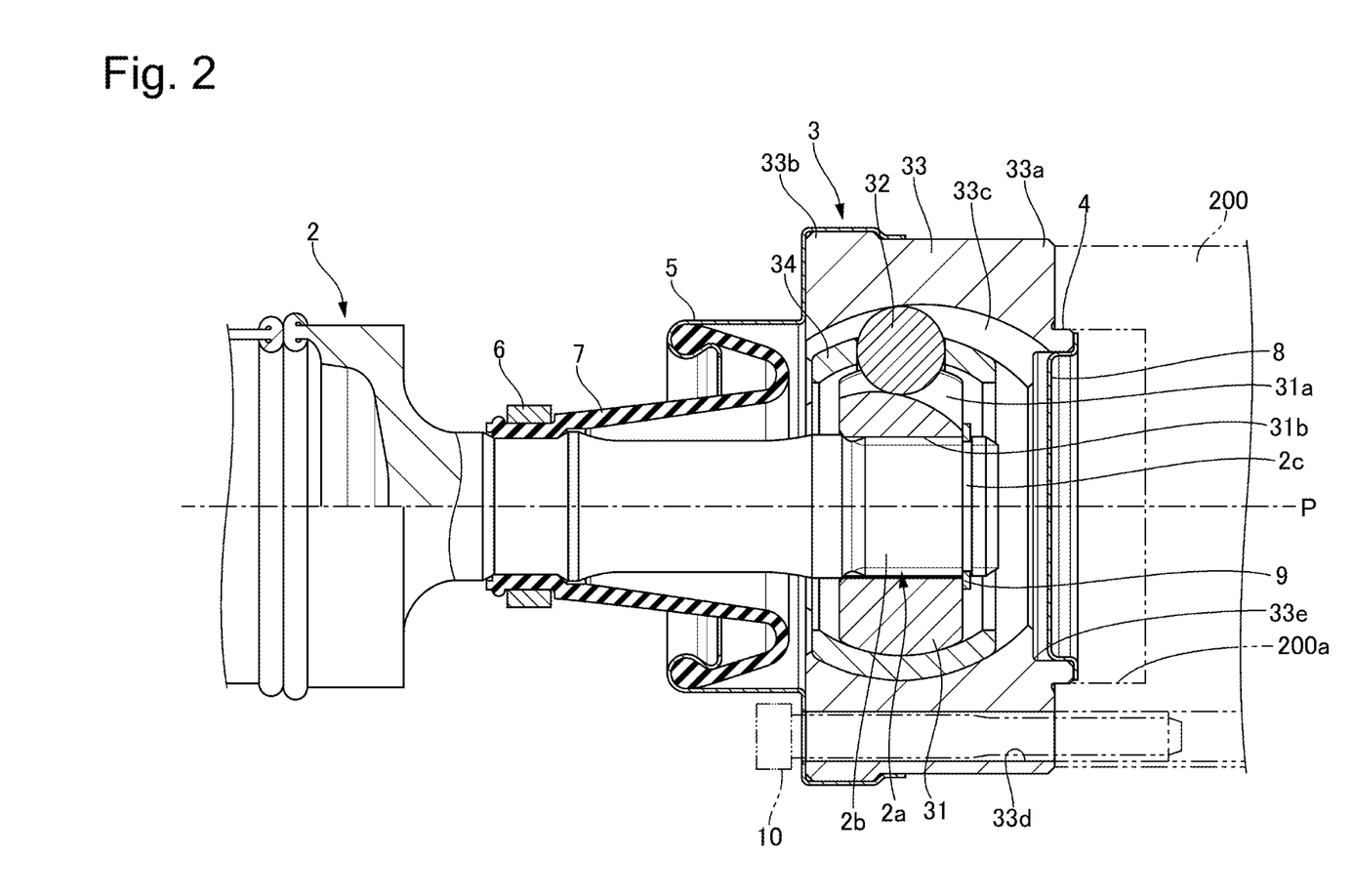
FIG. 2 is an enlarged cross-sectional view of a constant-velocity joint 3 according to the first embodiment.

FIG. 2 is an enlarged cross-sectional view of the constant-velocity joint 3 according to the first embodiment.

The configuration of the constant-velocity joint 3 according to the first embodiment will be described.

The constant-velocity joint 3 includes an inner race member 31, a plurality of balls (rolling members) 32, a cage 34, and an outer race member 33. A female spline 31$b$ is provided on the inner periphery of the inner race member 31. The plurality of balls 32 is disposed in a plurality of grooves 31$a$ on the outer periphery of the inner race member 31 in a radial direction with respect to a rotational axis P. The cage 34 holds the plurality of balls 32 on the inner race member 31. A plurality of race grooves 33$c$, in which the plurality of balls 32 is movable in the direction of the rotational axis P, is provided on the inner periphery of the outer race member 33. The outer race member 33 includes a first end portion 33$a$ and a second end portion 33$b$, which are the both end portions in the direction of the rotational axis P. The vehicle-side counterpart component 200 is coupled with the first end portion 33$a$ of the outer race member 33 on the vehicle rear side by being fixed thereto with use of bolts 10.

The vehicle-side counterpart component 200 is fixed by inserting the plurality of bolts 10 in through-holes 33d of the outer race member 33 and threadably engaging them with the vehicle-side counterpart component 200 after aligning an opening portion 200a of the vehicle-side counterpart component 200 with a centering portion 4 and fitting them. The centering portion 4 is provided at the first end portion 33a of the outer race member 33. The centering portion 4 is formed so as to protrude toward the vehicle rear side at a position located on a smaller diameter than the maximum diameter of the outer race member 33 and located on a smaller diameter than the radial positions of the bolt fastening through-holes 33d, i.e., at a position avoiding the bolt fastening through-holes 33d in the radial direction with respect to the rotational axis P.

Due to this configuration, the propeller shaft 1 can allow the vehicle-side counterpart component 200 such as the differential to have a small size.

Further, the propeller shaft 1 can secure the fastening surface between the outer race member 33 and the vehicle-side counterpart component 200.

Further, the shaft member 2 is inserted in the inner race member 31 in such a manner that a male spline 2b formed on the outer peripheral surface of one end portion 2a is splined to the female spline 31b of the inner race member 31.

Further, an outer peripheral groove 2c is formed on the way along the male spline 2b and a snap ring 9 is inserted in the outer peripheral groove 2c, by which the shaft member 2 is prevented from being detached off from the inner race member 31.

Further, the second end portion 33b of the constant-velocity joint 3 on the vehicle front side is surrounded by an attachment tool 5 fixed to the outer periphery of the second end portion 33b of the outer race member 33 on the vehicle front side and a waterproof boot 7 attached using a boot band 6, thereby being sealed between the outer race member 33 and the second shaft member 2.

Further, grease for lubrication is contained in the outer race member 33, and therefore a back cover member 8 is press-fitted in an opening portion 33e of the first end portion 33a of the outer race member 33 on the vehicle rear side and seals between inside and outside the outer race member 33 to prevent a leak of the grease.

Next, the advantageous effects will be described.

The advantageous effects of the propeller shaft 1 according to the first embodiment will be described now. (1) The propeller shaft 1 according to the first embodiment is configured in such a manner that the vehicle-side counterpart component 200 is fixed by inserting the plurality of bolts 10 in the through-holes 33d and threadably engaging them with the vehicle-side counterpart component 200 after aligning the opening portion 200a of the vehicle-side counterpart component 200 with the centering portion 4, which is provided at the first end portion 33a of the outer race member 33 and formed so as to protrude toward the vehicle rear side at the position located on the smaller diameter than the maximum diameter of the outer race member 33.

Therefore, the propeller shaft 1 according to the first embodiment can allow the vehicle-side counterpart component 200 such as the transmission and the differential to have a small radial size.

(2) The centering portion 4 formed at the outer race member 33 is configured to protrude toward the vehicle rear side at the position on the smaller diameter than the radial positions of the bolt fastening through-holes 33d in the radiation direction with respect to the rotational axis P.

Therefore, the propeller shaft 1 according to the first embodiment can secure the fastening surface between the outer race member 33 and the vehicle-side counterpart component 200.

Second Embodiment

Figure 3A:
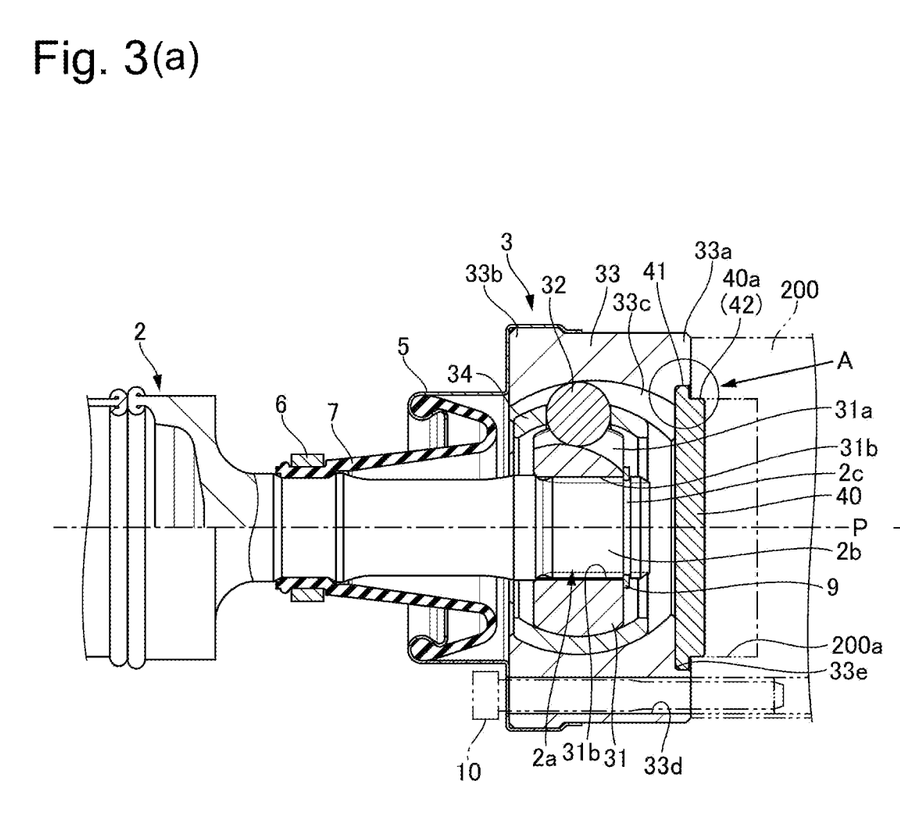
Figure 3B:
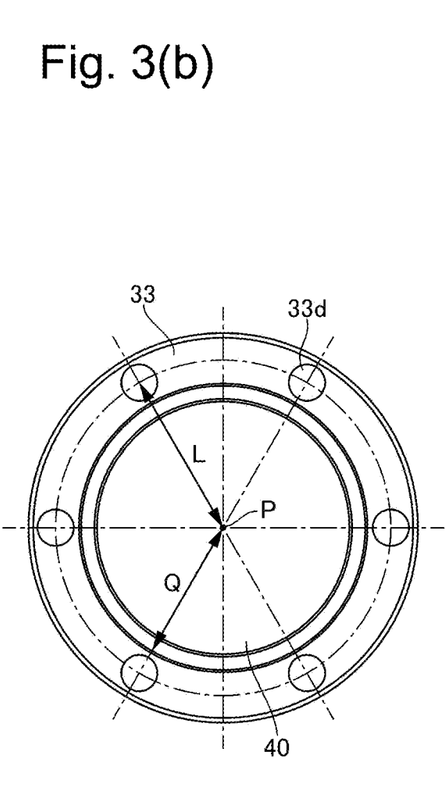
Figure 4:
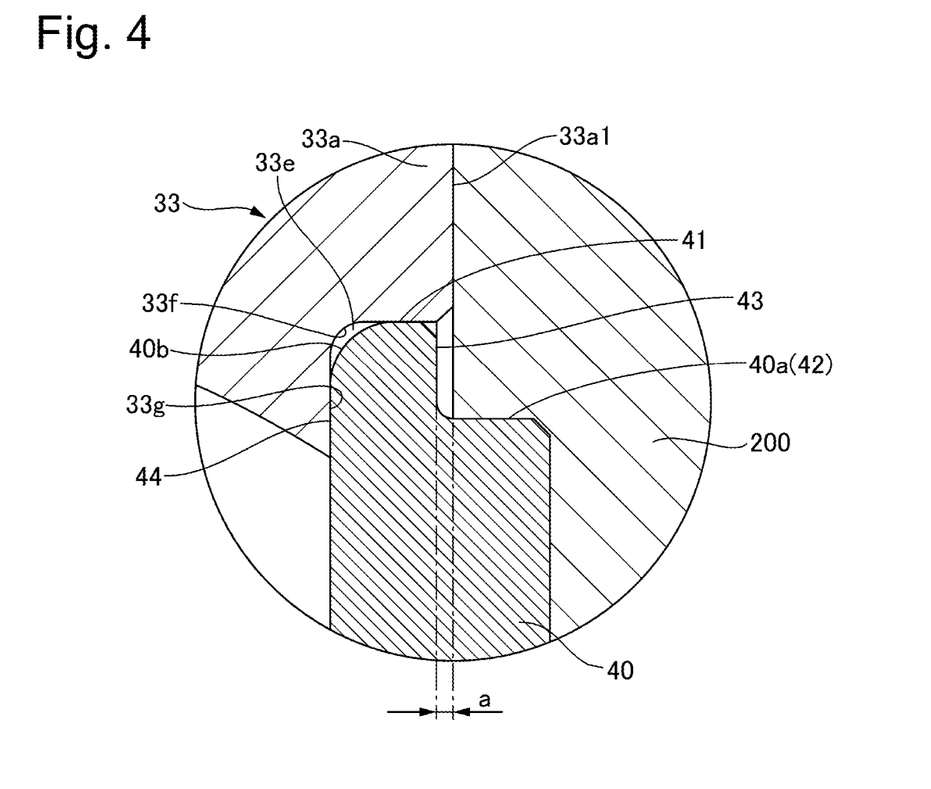
FIG. 4 is an enlarged view of an A portion in FIG. 3($a$).

FIG. 3(a) is an enlarged cross-sectional view of a constant-velocity joint 3 according to a second embodiment, and FIG. 3(b) is a side view of the constant-velocity joint 3 according to the second embodiment. FIG. 4 is an enlarged view of an A portion in FIG. 3(a).

The configuration of the constant-velocity joint 3 according to the second embodiment will be described.

As illustrated in FIG. 3(a), differently from the first embodiment, a circular centering member 40, which includes a centering portion 40a and is formed as a different member from the outer race member 33, is fixedly press-fitted in the circular opening portion 33e.

This configuration allows the outer race member 3 to easily conform with the shape of the vehicle-side counterpart component 200 by changing the shape of the centering member 40, i.e., the centering portion 40a without changing the shape of the outer race member 33.

Further, since the centering portion 40 is fixedly press-fitted in the opening portion 33e, no backlash is generated between the centering member 40 and the outer race member 33 and therefore the propeller shaft 1 can be less unbalanced.

The centering member 40 seals between inside and outside the outer race member 33 so as to prevent a leak of the grease contained in the outer race member 33.

This configuration eliminates the necessity of providing the back cover member 8 according to the first embodiment, thereby being able to cut down an increase in the number of parts.

As illustrated in FIG. 3(b), the plurality of bolt fixing through-holes 33d are formed at positions on the same diameter L when being viewed from the direction of the rotational axis P, and the opening portion 33e of the outer race member 33 and the centering member 40 are formed in such a manner that the inner diameter of the opening portion 33e and an outer diameter Q of the centering member 40 are smaller than the diameter L on which the plurality of bolt fixing through-holes 33d are formed.

In other words, the centering member 40 is inserted and press-fitted in the opening portion 33e of the outer race member 33 at a position avoiding the bolt fastening through-holes 33d.

As a result, the propeller shaft 1 can secure the fastening surface between the outer race member 33 and the vehicle-side counterpart component 200.

As illustrated in FIG. 4, the centering member 40 includes a larger-diameter portion 41 and a small-diameter portion 42. The large-diameter portion 41 is inserted and press-fitted in the opening portion 33e of the outer race member 33. The small-diameter portion 42 is smaller in diameter than the large-diameter portion 41, and forms the centering portion 40a protruding in a direction extending from the second end portion 33b toward the first end portion 33a of the outer race member 33.

Due to this configuration, the propeller shaft 1 can prevent a size increase of the connection portion with the vehicle-side counterpart component 200 such as the transmission and the differential.

Further, the centering portion 40 includes a stepped portion 43 connecting the large-diameter portion 41 and the small-diameter portion 42 in the radial direction with respect to the rotational axis P. The stepped portion 43 is placed closer to the second end portion 33b side than the first end portion 33a of the outer race member 33 is.

This means that a space a is formed between an end surface 33a1 of the first end portion 33a of the outer race member 33 and the stepped portion 43 in the direction of the rotational axis P.

Due to this configuration, the propeller shaft 1 allows the centering member 40 to make safe contact without interfering with the vehicle-side counterpart component 200 when the propeller shaft 1 is mounted onto the vehicle, thereby being able to improve the mounting workability.

Further, the opening portion 33e of the outer race member 33 includes a flat surface portion 33g provided along the radial direction with respect to the rotational axis P and having an annular seal surface to which a sealing material is applied along the entire circumference, and is brought into abutment with a flat surface portion 44 formed on the centering member 40 when the centering member 40 is inserted and press-fitted.

Due to this configuration, the propeller shaft 1 can prevent the centering member 40 from tilting and allow a sealing agent to be applied thereto, thereby achieving the sealing between inside and outside the outer race member 33.

Further, the opening portion 33e of the outer race member 33 includes an outer race member corner R portion 33f provided along the direction of the rotational axis P and connected to the flat surface portion 33g, and the centering member 40 includes a centering member corner R portion larger in diameter than the outer race member corner R portion at a position facing this outer race member corner R portion.

Due to this configuration, the propeller shaft 1 can prevent the centering member corner R portion of the centering member 40 from riding on the outer race member corner R portion 33f of the opening portion 33e of the outer race member 33.

The other configuration is similar to the first embodiment, and therefore portions shared with the first embodiment will be identified by the same reference numerals as the first embodiment and descriptions thereof will be omitted here.

Next, the advantageous effects will be described.

The propeller shaft 1 according to the second embodiment can bring about the following advantageous effects.

(1) The propeller shaft 1 according to the second embodiment is configured in such a manner that, at the first end portion 33a of the outer race member 33, the circular centering member 40, which includes the centering portion 40a and is formed as a different member from the outer race member 33, is fixedly press-fitted in the circular opening portion 33e in the direction of the rotational axis P.

This configuration allows the outer race member 33 to easily conform with the shape of the vehicle-side counterpart component 200 by changing the shape of the centering member 40, i.e., the centering portion 40a without changing the shape of the outer race member 33.

Further, since the centering portion 40 is fixedly press-fitted in the opening portion 33e, no backlash is generated between the centering member 40 and the outer race member 33 and therefore the propeller shaft 1 can be less unbalanced.

(2) The centering member 40 seals between inside and outside the outer race member 33 so as to prevent a leak of the grease contained in the outer race member 33.

This configuration eliminates the necessity of providing the back cover member 8 according to the first embodiment, thereby being able to cut down an increase in the number of parts.

(3) The propeller shaft 1 according to the second embodiment is configured in such a manner that the plurality of bolt fixing through-holes 33d are formed at positions on the same diameter L when being viewed from the direction of the rotational axis P, and the opening portion 33e of the outer race member 33 and the centering member 40 are formed in such a manner that the inner diameter of the opening portion 33e and the outer diameter Q of the centering member 40 are smaller than the diameter L on which the through-holes 33d are formed.

In other words, the propeller shaft 1 according to the second embodiment is configured in such a manner that the centering member 40 is inserted and press-fitted in the opening portion 33e of the outer race member 33 at a position avoiding the bolt fastening through-holes 33d.

Therefore, the propeller shaft 1 according to the second embodiment can secure the fastening surface between the outer race member 33 and the vehicle-side counterpart component 200.

(4) The centering member 40 is configured to include the larger-diameter portion 41 and the small-diameter portion 42. The large-diameter portion 41 is inserted and press-fitted in the opening portion 33e of the outer race member 33. The small-diameter portion 42 is smaller in diameter than the large-diameter portion 41, and forms the centering portion 40a protruding in the direction extending from the second end portion 33b toward the first end portion 33a of the outer race member 33.

Due to this configuration, the propeller shaft 1 can prevent a size increase of the connection portion with the vehicle-side counterpart component 200 such as the transmission and the differential.

(5) The propeller shaft 1 according to the second embodiment is configured in such a manner that the centering member 40 includes the stepped portion 43 connecting the large-diameter portion 41 and the small-diameter portion 42 in the radial direction with respect to the rotational axis P, and the stepped portion 43 is placed closer to the second end portion 33b side than the first end portion 33a of the outer race member 33 is, thereby causing the space a to be generated between the end surface 33a1 of the first end portion 33a of the outer race member 33 and the stepped portion 43.

Therefore, the propeller shaft 1 according to the second embodiment allows the centering member 40 to make safe contact without interfering with the vehicle-side counterpart component 200 when the propeller shaft 1 is mounted onto the vehicle, thereby being able to improve the mounting workability.

(6) The opening portion 33e of the outer race member 33 is configured to include the flat surface portion 33g provided along the radial direction with respect to the rotational axis P and having the annular seal surface to which the sealing material is applied along the entire circumference, and be brought into abutment with the flat surface portion 44 formed on the centering member 40 when the centering member 40 is inserted and press-fitted.

Therefore, the propeller shaft 1 according to the second embodiment can prevent the centering member 40 from tilting and allow the sealing agent to be applied thereto, thereby achieving the sealing between inside and outside the outer race member 33.

(7) The propeller shaft 1 according to the second embodiment is configured in such a manner that the opening portion 33e of the outer race member 33 includes the outer race member corner R portion 33f provided along the direction of the rotational axis P and connected to the flat surface portion 33g, and the centering member 40 includes the centering member corner R portion larger in diameter than the outer race member corner R portion at the position facing this outer race member corner R portion.

Therefore, the propeller shaft 1 according to the second embodiment can prevent the centering member corner R portion of the centering member 40 from riding on the outer race member corner R portion 33f of the opening portion 33e of the outer race member 33.

Third Embodiment

Figure 5:
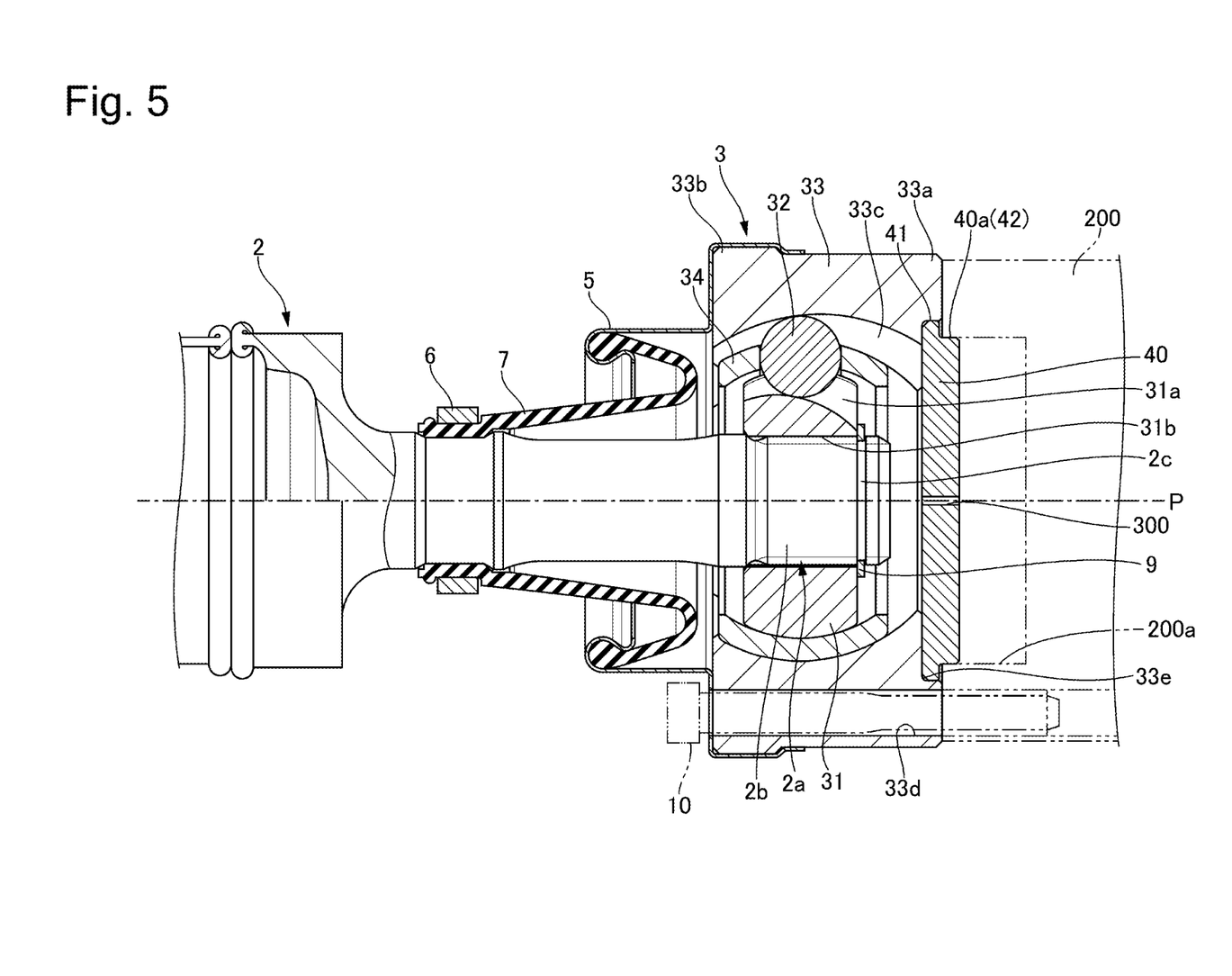
FIG. 5 is an enlarged cross-sectional view of a constant-velocity joint 3 according to a third embodiment.

FIG. 5 is an enlarged cross-sectional view of a constant-velocity joint 3 according to a third embodiment.

Differently from the second embodiment, the centering member 40 includes a through-hole 300 connecting inside and outside the outer race member 33.

Due to this configuration, the propeller shaft 1 can suppress an increase in the inner pressure of the constant-velocity joint 3, thereby preventing the waterproof boot 7 from being deformed, even when no air hole is provided to the waterproof boot 7.

Further, the through-hole 300 is provided at the central portion of the centering member 40 in the radial direction with respect to the rotational axis P.

Due to this configuration, the grease can be prevented from leaking from the through-hole 300 because the grease flows outward due to the centrifugal force.

The other configuration is similar to the second embodiment, and therefore portions shared with the second embodiment will be identified by the same reference numerals as the second embodiment and descriptions thereof will be omitted here.

Next, the advantageous effects will be described.

The propeller shaft 1 according to the third embodiment can bring about the following advantageous effects in addition to the advantageous effects of the second embodiment.

(1) The centering member 40 is configured to include the through-hole 300 connecting inside and outside the outer race member 33.

Therefore, the propeller shaft 1 according to the third embodiment can suppress an increase in the inner pressure of the constant-velocity joint 3, thereby preventing the waterproof boot 7 from being deformed, even when no air hole is provided to the waterproof boot 7.

(2) The centering member 40 is configured in such a manner that the through-hole 300 is provided at the central portion of the centering member 40 in the radial direction with respect to the rotational axis P.

Therefore, the grease can be prevented from leaking from the through-hole 300 because the grease flows outward due to the centrifugal force.

Fourth Embodiment

Figure 6A:
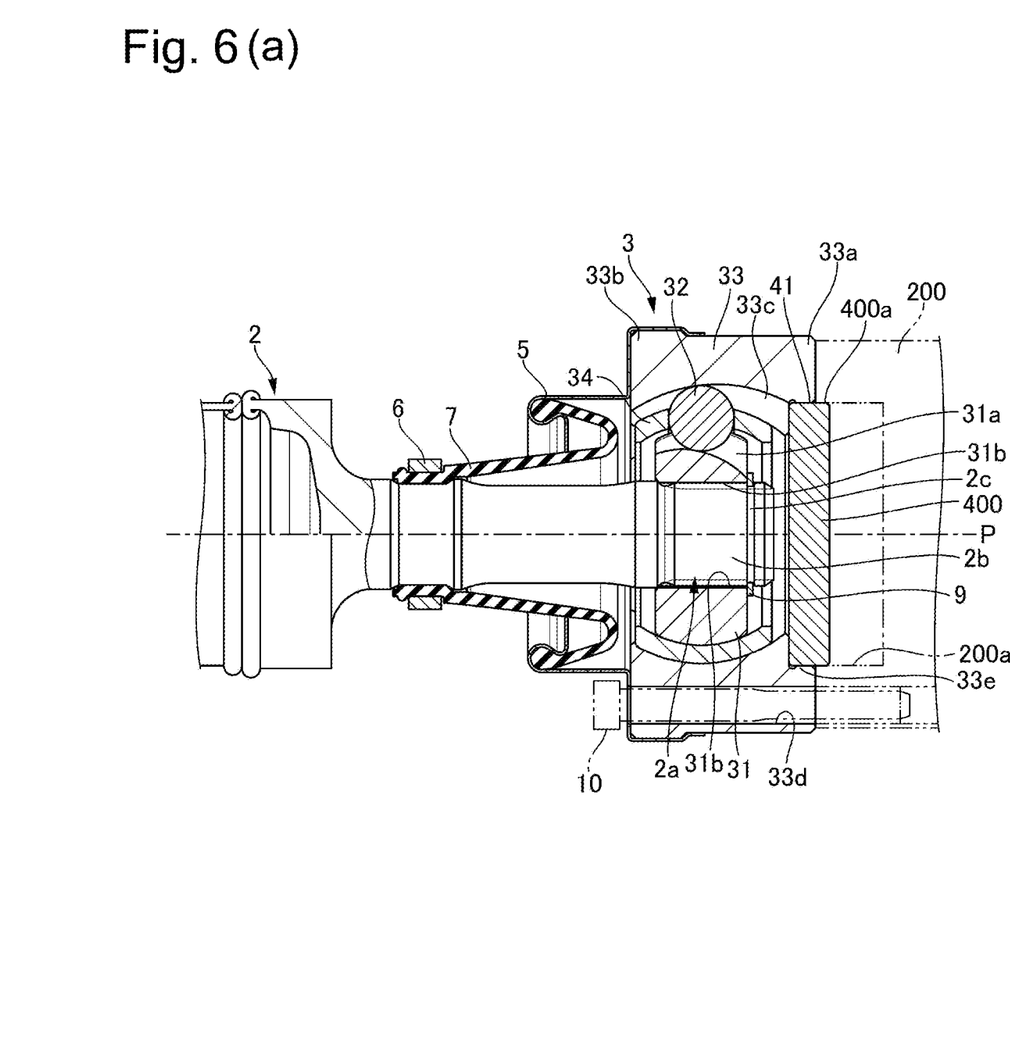
Figure 6B:
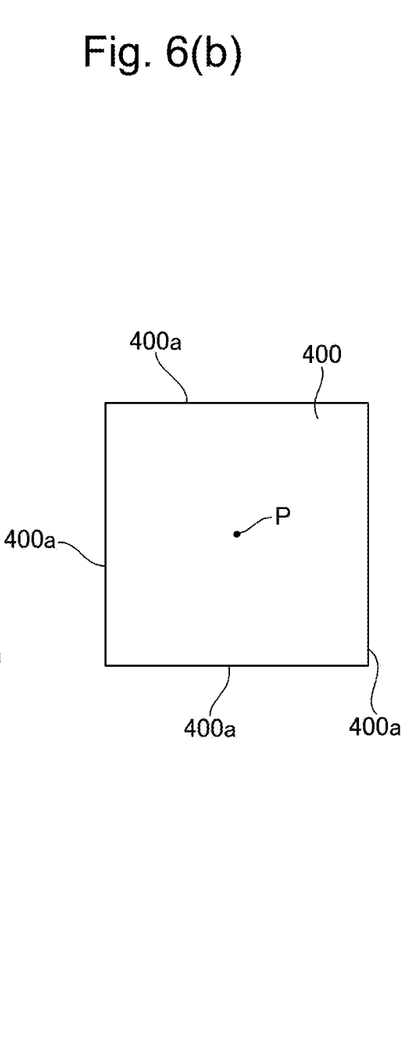

FIG. 6(*a*) is an enlarged cross-sectional view of a constant-velocity joint 3 according to a fourth embodiment, and FIG. 6(*b*) illustrates a centering member 400 alone.

Differently from the second embodiment, the circular centering member 40 is replaced with the rectangular centering member 400.

Due to this configuration, the centering member 400 has a simple shape and therefore can be easily manufactured.

Further, the opening portion 33e of the outer race member 33 is also rectangularly formed.

The other configuration is similar to the second embodiment, and therefore portions shared with the second embodiment will be identified by the same reference numerals as the second embodiment and descriptions thereof will be omitted here.

Next, the advantageous effects will be described.

The propeller shaft 1 according to the fourth embodiment can bring about the following advantageous effects in addition to the advantageous effects of the second embodiment.

(1) The centering member 400 is configured to be rectangularly formed.

Therefore, the centering member 400 has a simple shape and therefore can be easily manufactured.

Other Embodiments

Having described the embodiments for implementing the present invention, the specific configuration of the present invention is not limited to the configurations of the embodiments, and the present invention also includes a design modification and the like thereof made within a range that does not depart from the spirit of the present invention, if any.

In the following description, technical ideas recognizable from the above-described embodiments will be described.

A propeller shaft, in one configuration thereof, includes a rotational shaft, and a constant-velocity joint provided on the propeller shaft. The constant-velocity joint includes an inner race member connected to the rotational shaft of the propeller shaft, a rolling member disposed on an outer periphery of the inner race member in a radial direction with respect to a direction of a rotational axis of the rotational shaft, and a tubular outer race member provided on an outer periphery of the rolling member in the radial direction and configured in such a manner that a rotational force of the rotational shaft is transmitted thereto via the rolling member. The outer race member has a first end portion and a second end portion that are both end portions of the outer race member in the direction of the rotational axis. The outer race member includes a centering portion provided at the first end portion of these end portions and formed so as to be smaller than a maximum diameter of the outer race member in the radial direction.

According to a further preferable configuration, in the above-described configuration, the outer race member includes an opening portion at the first end portion of the outer race member. The opening portion is opened in the direction of the rotational axis. The propeller shaft further includes a centering member with the centering portion formed thereon and placed in abutment with the opening portion.

According to a further preferable configuration, in the above-described configuration, the outer race member includes grease contained therein. The centering member seals the opening portion.

According to further another preferable configuration, in any of the above-described configurations, the centering member includes a through-hole connecting inside and outside the outer race member.

According to a further preferable configuration, in the above-described configuration, the through-hole is provided at a central portion of the centering member in the radial direction with respect to the rotational axis.

According to further another preferable configuration, in any of the above-described configurations, the centering member is fixedly press-fitted in the opening portion of the outer race member.

According to further another preferable configuration, in any of the above-described configurations, the centering member includes a large-diameter portion inserted in the opening portion of the outer race member, and a small-diameter portion smaller in diameter than the large-diameter portion in the radial direction with respect to the rotational axis. The small-diameter portion protrudes in a direction extending from the second end portion toward the first end portion of the outer race member in the direction of the rotational axis.

According to a further preferable configuration, in the above-described configuration, the centering member includes a stepped portion connecting the large-diameter portion and the small-diameter portion in the radial direction with respect to the rotational axis. The stepped portion is provided closer to one side where the second end portion of the outer race member is located than the first end portion of the outer race member is in a direction extending from the first end portion toward the second end portion of the outer race member in the direction of the rotational axis.

According to further another preferable configuration, in any of the above-described configurations, the opening portion of the outer race member includes a flat surface portion provided along the radial direction with respect to the rotational axis. The centering member includes a flat surface portion in abutment with the flat surface portion.

According to a further preferable configuration, in the above-described configuration, the flat surface portion of the opening portion of the outer race member includes an annular seal surface provided along an entire circumference in the radial direction with respect to the rotational axis.

According to further another preferable configuration, in any of the above-described configurations, the opening portion of the outer race member includes an outer race member corner R portion provided along the direction of the rotational axis and connected to the flat surface portion. The centering member includes a centering member corner R portion provided at a position facing the outer race member corner R portion and larger in diameter than the outer race member corner R portion.

According to further another preferable configuration, in any of the above-described configurations, the centering member is formed rectangularly when being viewed from the direction of the rotational axis. The centering member protrudes beyond the first end portion of the outer race member in a direction extending from the second end portion toward the first end portion of the outer race member in the direction of the rotational axis.

According to further another preferable configuration, in any of the above-described configurations, the outer race member includes a plurality of bolt fastening through-holes at the first end portion. The plurality of bolt fastening through-holes is provided at predetermined intervals in the radial direction with respect to the rotational axis. The centering portion is provided at a position avoiding the plurality of bolt fastening through-holes.

According to further another preferable configuration, in any of the above-described configurations, the plurality of bolt fastening through-holes of the outer race member is formed at positions on the same diameter when being viewed from the direction of the rotational axis. The centering member is formed so as to have a smaller diameter than the diameter on which the plurality of bolt fastening through-holes is formed in the radial direction with respect to the rotational axis.

A constant-velocity joint provided on a propeller shaft, in one configuration thereof, includes an inner race member connected to the propeller shaft, a rolling member disposed on an outer periphery of the inner race member in a radial direction with respect to a direction of a rotational axis of the propeller shaft, and a tubular outer race member provided on an outer periphery of the rolling member in the radial direction and configured in such a manner that a rotational force of the rotational shaft is transmitted thereto via the rolling member. The outer race member has a first end portion and a second end portion that are both end portions of the outer race member in the direction of the rotational axis. The outer race member includes a centering portion provided at the first end portion of these end portions and formed so as to be smaller than a maximum diameter of the outer race member in the radial direction.

The present invention shall not be limited to the above-described embodiments, and includes various modifications. For example, the above-described embodiments have been described in detail to facilitate a better understanding of the present invention, and the present invention shall not necessarily be limited to the configuration including all of the described features. Further, a part of the configuration of some embodiment can be replaced with the configuration of another embodiment. Further, some embodiment can also be implemented with a configuration of another embodiment added to the configuration of this embodiment. Further, each of embodiments can also be implemented with another configuration added, deleted, or replaced with respect to a part of the configuration of this embodiment.

The present application claims priority under the Paris Convention to Japanese Patent Application No. 2019-037167 filed on Mar. 1, 2019. The entire disclosure of Japanese Patent Application No. 2019-037167 filed on Mar. 1, 2019 including the specification, the claims, the drawings, and the abstract is incorporated herein by reference in its entirety.

REFERENCE SIGNS LIST 1 propeller shaft
2 shaft member
3 constant-velocity joint
31 inner race member
31a groove
31b female spline
31c inner peripheral groove
32 ball (rolling member)
33 outer race member
33a first end portion
33b second end portion
33c race groove
33d bolt fastening through-hole
33e opening portion
33f outer race member corner R portion
33g flat surface portion
34 cage
4 centering portion
40 centering member
40a centering portion
40b centering member corner R portion 41 large-diameter portion
42 small-diameter portion (centering portion)
43 stepped portion
44 flat surface portion
5 vehicle-side tool
6 boot band
7 waterproof boot
8 back cover member
9 snap ring
200 vehicle-side counterpart component
300 through-hole
P rotational axis

The invention claimed is:

1. A propeller shaft comprising:
a rotational shaft; and
a constant-velocity joint provided on this propeller shaft,
wherein the constant-velocity joint includes
an inner race member connected to the rotational shaft of the propeller shaft,
a rolling member disposed on an outer periphery of the inner race member in a radial direction with respect to a direction of a rotational axis of the rotational shaft,
a tubular outer race member provided on an outer periphery of the rolling member in the radial direction and configured in such a manner that a rotational force of the rotational shaft is transmitted thereto via the rolling member, and
a centering member formed as a different member from the outer race member,
the outer race member having a first end portion and a second end portion that are both end portions of the outer race member in the direction of the rotational axis,
the centering member including a centering portion provided at the first end portion side of these end portions and formed so as to be smaller than a maximum diameter of the outer race member in the radial direction, and
wherein the centering portion is formed so as to protrude toward a vehicle rear side such that the centering portion aligns an opening portion of a vehicle-side counterpart component to be fitted into the opening portion of the vehicle-side counterpart component, thereby centering the vehicle-side counterpart component relative to the outer race member.

2. The propeller shaft according to claim 1, wherein the outer race member includes an opening portion at the first end portion of the outer race member, the opening portion being opened in the direction of the rotational axis, and
wherein the centering member is placed in abutment with the opening portion such that the centering portion is formed.

3. The propeller shaft according to claim 2, wherein the outer race member includes grease contained therein, and
wherein the centering member seals the opening portion.

4. The propeller shaft according to claim 2, wherein the centering member includes a through-hole connecting inside and outside the outer race member.

5. The propeller shaft according to claim 4, wherein the through-hole is provided at a central portion of the centering member in the radial direction with respect to the rotational axis.

6. The propeller shaft according to claim 2, wherein the centering member is fixedly press-fitted in the opening portion of the outer race member.

7. The propeller shaft according to claim 2, wherein the centering member includes a large-diameter portion inserted in the opening portion of the outer race member, and
a small-diameter portion smaller in diameter than the large-diameter portion in the radial direction with respect to the rotational axis, the small-diameter portion protruding in a direction extending from the second end portion toward the first end portion of the outer race member in the direction of the rotational axis.

8. The propeller shaft according to claim 7, wherein the centering member includes a stepped portion connecting the large-diameter portion and the small-diameter portion in the radial direction with respect to the rotational axis, and
wherein the stepped portion is provided closer to one side where the second end portion of the outer race member is located than the first end portion of the outer race member is in a direction extending from the first end portion toward the second end portion of the outer race member in the direction of the rotational axis.

9. The propeller shaft according to claim 2, wherein the opening portion of the outer race member includes a flat surface portion provided along the radial direction with respect to the rotational axis, and
wherein the centering member includes a flat surface portion in abutment with the flat surface portion.

10. The propeller shaft according to claim 9, wherein the flat surface portion of the opening portion of the outer race member includes an annular seal surface provided along an entire circumference in the radial direction with respect to the rotational axis.

11. The propeller shaft according to claim 9, wherein the opening portion of the outer race member includes an outer race member corner R portion provided along the direction of the rotational axis and connected to the flat surface portion, and
wherein the centering member includes a centering member corner R portion provided at a position facing the outer race member corner R portion and larger in diameter than the outer race member corner R portion.

12. The propeller shaft according to claim 2, wherein the centering member is formed rectangularly when being viewed from the direction of the rotational axis, and
wherein the centering member protrudes beyond the first end portion of the outer race member in a direction extending from the second end portion toward the first end portion of the outer race member in the direction of the rotational axis.

13. The propeller shaft according to claim 2, wherein the outer race member includes a plurality of bolt fastening through-holes at the first end portion, the plurality of bolt fastening through-holes being provided at predetermined intervals in the radial direction with respect to the rotational axis, and
wherein the centering portion is provided at a position avoiding the plurality of bolt fastening through-holes.

14. The propeller shaft according to claim 13, wherein the plurality of bolt fastening through-holes of the outer race member is formed at positions on the same diameter when being viewed from the direction of the rotational axis, and
wherein the centering member is formed so as to have a smaller diameter than the diameter on which the plurality of bolt fastening through-holes is formed in the radial direction with respect to the rotational axis.

15. A constant-velocity joint provided on a propeller shaft, the constant-velocity joint comprising:
an inner race member connected to the propeller shaft;

a rolling member disposed on an outer periphery of the inner race member in a radial direction with respect to a direction of a rotational axis of the propeller shaft;

a tubular outer race member provided on an outer periphery of the rolling member in the radial direction and configured in such a manner that a rotational force of the rotational shaft is transmitted thereto via the rolling member, and a circular centering member formed as a different member from the outer race member, the outer race member having a first end portion and a second end portion that are both end portions of the outer race member in the direction of the rotational axis, the circular centering member including a centering portion provided at the first end portion side of these end portions and formed so as to be smaller than a maximum diameter of the outer race member in the radial direction, and wherein the centering portion is formed so as to protrude toward a vehicle rear side such that the centering portion aligns an opening portion of a vehicle-side counterpart component to be fitted into the opening portion of the vehicle-side counterpart component, thereby centering the vehicle-side counterpart component relative to the outer race member.

* * * * *